United States Patent
Huang et al.

(10) Patent No.: US 9,651,112 B2
(45) Date of Patent: May 16, 2017

(54) VIBRATION SUPPRESSION METHOD, CONTROLLER, DEVICE OF BOOM AND PUMP TRUCK

(71) Applicants: ZOOMLION HEAVY INDUSTRY SCIENCE AND TECHNOLOGY CO., LTD., Changsha, Hunan (CN); HUNAN ZOOMLION INTELLIGENT TECHNOLOGY CO. LTD, Changsha, Hunan (CN)

(72) Inventors: Yi Huang, Hunan (CN); Jiaqian Wang, Hunan (CN); Lu Huang, Hunan (CN); Hao Kuang, Hunan (CN); Wen Yang, Hunan (CN)

(73) Assignees: ZOOMLION HEAVY INDUSTRY SCIENCE AND TECHNOLOGY CO., LTD. (CN); HUNAN ZOOMLION INTELLIGENT TECHNOLOGY CO. LTD (CN)

( * ) Notice: Subject to any disclaimer, the term of this patent is extended or adjusted under 35 U.S.C. 154(b) by 418 days.

(21) Appl. No.: 14/352,923

(22) PCT Filed: Oct. 22, 2012

(86) PCT No.: PCT/CN2012/001409
§ 371 (c)(1),
(2) Date: Apr. 18, 2014

(87) PCT Pub. No.: WO2013/056517
PCT Pub. Date: Apr. 25, 2013

(65) Prior Publication Data
US 2014/0298784 A1    Oct. 9, 2014

(30) Foreign Application Priority Data
Oct. 20, 2011   (CN) .......................... 2011 1 0319995

(51) Int. Cl.
*F16F 15/027* (2006.01)
*E04G 21/04* (2006.01)
(Continued)

(52) U.S. Cl.
CPC .......... *F16F 15/027* (2013.01); *B66C 13/066* (2013.01); *E04G 21/0436* (2013.01); *E04G 21/0454* (2013.01); *F16F 15/002* (2013.01)

(58) Field of Classification Search
CPC ... B66C 13/066; B66C 13/46; E04G 21/0436; E04G 21/0454; E02F 9/2207; F16F 15/162
See application file for complete search history.

(56) References Cited

U.S. PATENT DOCUMENTS 5,832,730 A * 11/1998 Mizui .................. B66C 13/066
                                                          60/469
6,883,532 B2 * 4/2005 Rau ....................... B66C 13/066
                                                          137/1

(Continued)

FOREIGN PATENT DOCUMENTS

CN   102108790 A   6/2010
CN      1932215 B   8/2010
(Continued)

OTHER PUBLICATIONS

International Search Report and Written Opinion issued in corresponding International Patent Application No. PCT/CN2012/001409 dated May 25, 2011. (English Translation Provided).

*Primary Examiner* — Eric Keasel
*Assistant Examiner* — Matthew Wiblin
(74) *Attorney, Agent, or Firm* — Volpe and Koenig, P.C.

(57) ABSTRACT

A revolution vibration suppressing method and apparatus for pump truck boom is provided. Vibration severity of the boom in the revolution direction is detected. Dynamic (Continued)

characteristic parameters of the boom are extracted. A control signal that can be used to control the revolving actuator to compensate the vibration severity according to the vibration severity and the dynamic characteristic parameters is calculated. The revolving actuator is driven according to the control signal to move, to suppress the revolution vibration of the boom. A revolution vibration suppression controller and a revolution vibration suppression device for a pump truck boom are provided to implement the methods. With the disclosed methods and apparatus, the vibration of a pump truck boom in the revolution direction can be suppressed, and therefore the risk of failures of the boom is decreased and the operating safety in the work is improved.

12 Claims, 6 Drawing Sheets

(51) Int. Cl.
*B66C 13/06* (2006.01)
*F16F 15/00* (2006.01)

(56) References Cited

U.S. PATENT DOCUMENTS

| | | | | |
|---|---|---|---|---|
| 7,278,262 B2* | 10/2007 | Moon | ............... | E02F 9/2207 |
| | | | | 60/426 |
| 7,296,404 B2* | 11/2007 | Pfaff | ............... | E02F 9/2207 |
| | | | | 60/327 |
| 7,729,832 B2* | 6/2010 | Benckert | ............... | E04G 21/04 |
| | | | | 198/318 |
| 8,925,310 B2* | 1/2015 | Pirri | ............... | B66C 13/066 |
| | | | | 60/426 |
| 2015/0204090 A1* | 7/2015 | Wan | ............... | E04G 21/0454 |
| | | | | 700/280 |

FOREIGN PATENT DOCUMENTS

| | | | | |
|---|---|---|---|---|
| CN | 201598834 U | | 10/2010 | |
| CN | 101886472 A | * | 11/2010 | ........... B66C 13/066 |
| CN | 102071809 A | | 5/2011 | |
| CN | 202510620 U | | 10/2012 | |
| CN | 103062281 A | | 4/2013 | |
| CN | 103062281 B | | 12/2013 | |

* cited by examiner

VIBRATION SUPPRESSION METHOD, CONTROLLER, DEVICE OF BOOM AND PUMP TRUCK

TECHNICAL FIELD

The present invention relates to a pump truck and a method, a controller, and a device for vibration suppression of the boom thereof, and in particular to a pump truck and a method, a controller, a device for suppressing vibration of the boom thereof in the revolution direction.

BACKGROUND

At present, a boom is a common upper structure used on the special vehicles. The boom usually needs to do extension/retraction, revolution, or translation movement when it's working. If the boom has vibration in the revolution direction during the movement, not only the normal operation of the upper structure may be affected, but also the service life of the boom or upper structure may be shortened, and even accidents may occur.

For example, on a concrete pump truck, the boom is a slender and flexible cantilever beam structure formed by several sections articulated together. If severe vibration occurs in the revolution direction when the boom is revolving or the concrete is being pumped, not only the service life of the structural parts of the pump truck will be shortened, but also severe personal injury accidents may occur. Therefore, it is of great significance to effectively suppress vibration of the boom, especially the vibration of the boom in the revolution direction, in order to improve operation safety of the boom.

For example, on a concrete pump truck, usually the pumping gear is shifted down to decrease the pumping rate and pumping efficiency, or the attitude of the boom is changed, so as to adjust the inherent frequency of the boom. However, the above method are time and labor consuming, and affect construction period.

In addition, there's another method changing the form of operating current of the revolving mechanism at starting/baking of the revolving operation, e.g., changing square wave to the form of sloped square wave or increasing the slope rate to buffer the vibration; however, that method does not only increase the time of revolving operation of the boom; more adversely, owing to the existence of the sloped revolving operating current, the boom will revolve further to some distance even though the pump truck operator has issued a braking signal. Therefore, a potential safety hazard still exist.

SUMMARY OF THE INVENTION

The object of the present invention is to provide a revolution vibration suppression method for boom, a revolution vibration suppression controller for boom, and a vibration suppression system for boom, which can effectively suppress vibration of the boom in the revolution direction.

To attain that object, the present invention provides a revolution vibration suppressing method for a pump truck boom, wherein, the boom is mounted on a revolving platform of the pump truck, and the revolving platform is driven to revolve by a revolving actuator so as to drive the boom to revolve; the revolution vibration suppressing method comprises:

detecting the vibration severity of the boom in the revolution direction;

extracting the dynamic characteristic parameters of the boom;

calculating a control signal that can be used to control the revolving actuator to compensate the vibration severity according to the vibration severity and dynamic characteristic parameters extracted; and driving the revolving actuator according to the control signal to move, to suppress the revolution vibration of the boom.

To attain that object, the present invention provides a revolution vibration suppressing controller for a pump truck boom, wherein, the boom is mounted on a revolving platform of the pump truck, and the revolving platform is driven to revolve by a revolving actuator so as to drive the boom to revolve; the revolution vibration suppressing controller comprises an input module, a processing module, and a control module, is characterized in that:

the input module is designed to receive a vibration severity signal that represents the vibration severity of boom in the revolution direction;

the processing module is designed to extract the dynamic characteristic parameters of the boom, generate a control signal that can compensate the vibration severity according to the vibration severity signal and the extracted dynamic characteristic parameters, and send the control signal to the control module;

the control module is designed to control the revolving actuator to move according to the control signal.

To attain that object, the present invention provides a revolution vibration suppression device for a pump truck boom, wherein, the boom is mounted on a revolving platform of the pump truck, and the revolving platform is driven to revolve by a revolving actuator so as to drive the boom to revolve, wherein, the revolution vibration suppression device comprises: a first sensor, which is designed to detect the vibration severity of the boom in the revolution direction and generate a vibration severity signal represents the vibration severity of the boom in the revolution direction; and the revolution vibration suppression controller according to the present application, wherein, the first sensor is connected to the input module of the revolution vibration suppression controller.

Moreover, another object of the present invention is to provide a pump truck, the pump truck comprises the revolution vibration suppression device according to the present application.

With the above technical scheme, detecting the vibration severity of the boom in the revolution direction, calculating a control signal that can be used to control the revolving actuator to compensate the vibration severity according to the vibration severity; and driving the revolving actuator according to the control signal to move, to suppress the revolution vibration of the boom. The technical scheme not only reduces the risk of failures of the boom but also improves operation safety in the work.

Other characteristics and advantages of the present invention will be further detailed in the embodiments hereunder.

BRIEF DESCRIPTION OF THE DRAWINGS

The accompanying drawings are provided here to facilitate further understanding on the present invention, and are a part of this document. They are used together with the following embodiments to explain the present invention, but shall not be comprehended as constituting any limitation to the present invention. Among the drawings.

| Brief Description of the Symbols | |
|---|---|
| 1 - boom | 2 - revolving platform |
| 21 - second gear | 3 - hydraulic motor |
| 31 - first gear | 11 - last section |
| 4 Revolving cylinder | 41 Rack |
| 50 Input module | 60 Processing module |
| 70 Control module | 80 First sensor |
| 90 Second sensor | |

DETAILED DESCRIPTION OF THE EMBODIMENTS

Hereunder the embodiments of the present invention will be detailed, with reference to the accompanying drawings. It should be appreciated that the embodiments described here are only provided to describe and explain the present invention, but shall not be deemed as constituting any limitation to the present invention.

First, the main structures involved in revolution of a pump truck will be described with reference to FIG. 1-5. A pump truck mainly comprises a boom 1, a chassis, an uploading assembly, and an pumping unit, wherein, the revolving mechanism is a part of the uploading assembly, and comprises a revolving platform 2 and a revolving actuator, wherein, the boom 1 is mounted on the revolving platform 2, and the revolving platform 2 is driven by the revolving actuator to drive the boom 1 to revolve.

Figure 1:
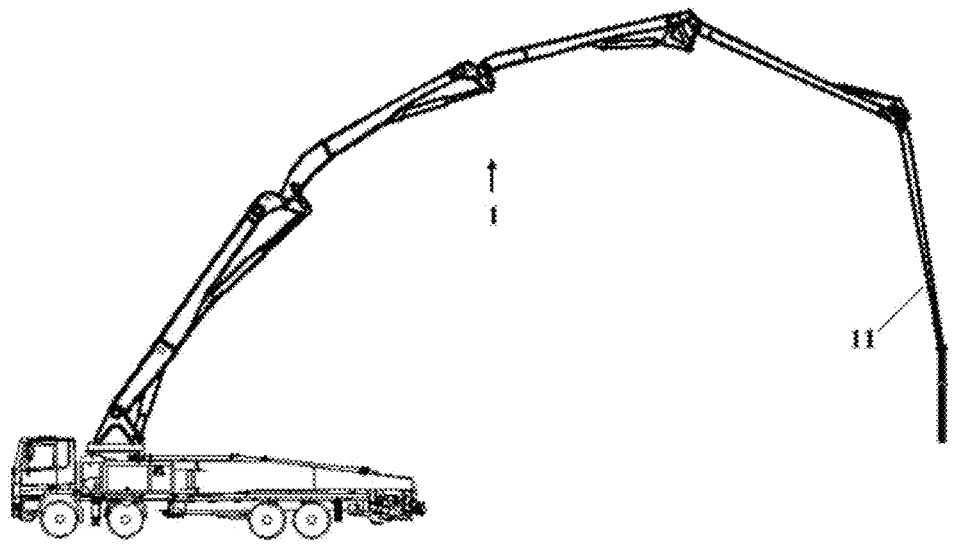
FIG. 1 illustrates a schematic diagram of a pump truck.

As shown in FIG. 1, the boom 1 comprises N sections connected sequentially, wherein, the section that is connected to the revolving platform 2 is referred to as the first section; accordingly, the last section is referred to as the last section 11, which is connected with a hose; the vibration of the boom mainly refers to the vibration of the end of the boom which connected with the hose, i.e., the vibration on the last section 11. Regarding the present invention, the vibration of the boom in the revolution direction mainly refers to the vibration on the last section 11 in the revolution direction; therefore, the revolution vibration suppression method and revolution vibration suppression device provided in the present invention are mainly embodied in suppression of the vibration on the last section 11 in the revolution direction.

The revolving platform 2 comprises an revolution supporting outer ring and an revolution supporting inner ring; the inner ring and outer ring are connected via steel balls; the inner ring is fixedly connected to the chassis, and the outer ring is connected to the upper turntable.

The revolving actuator can be implemented in a variety of forms, e.g., a revolving actuator with a hydraulic motor, or a revolving actuator with a revolving cylinder.

Figure 2:
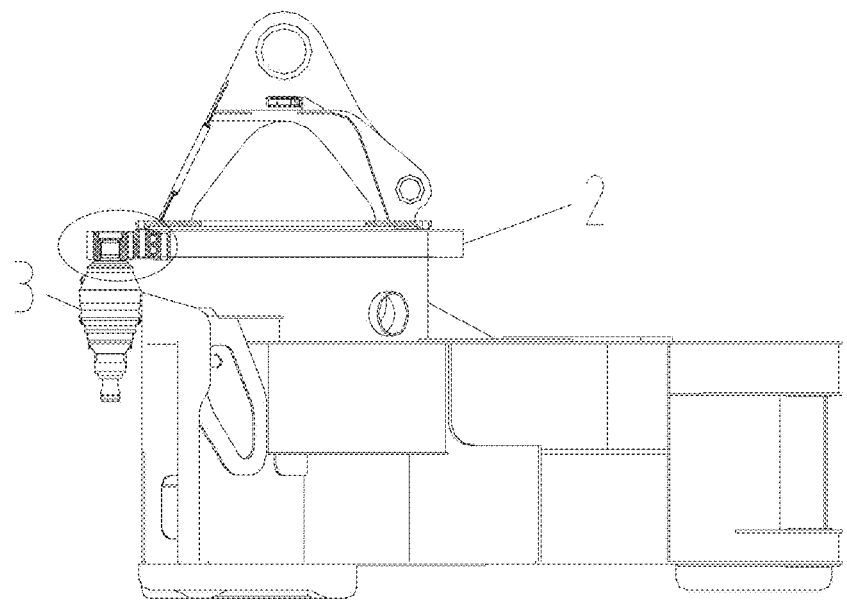
FIG. 2 illustrates a schematic diagram of the connection between the hydraulic motor and revolving platform in a preferred embodiment of the present invention.
Figure 3:
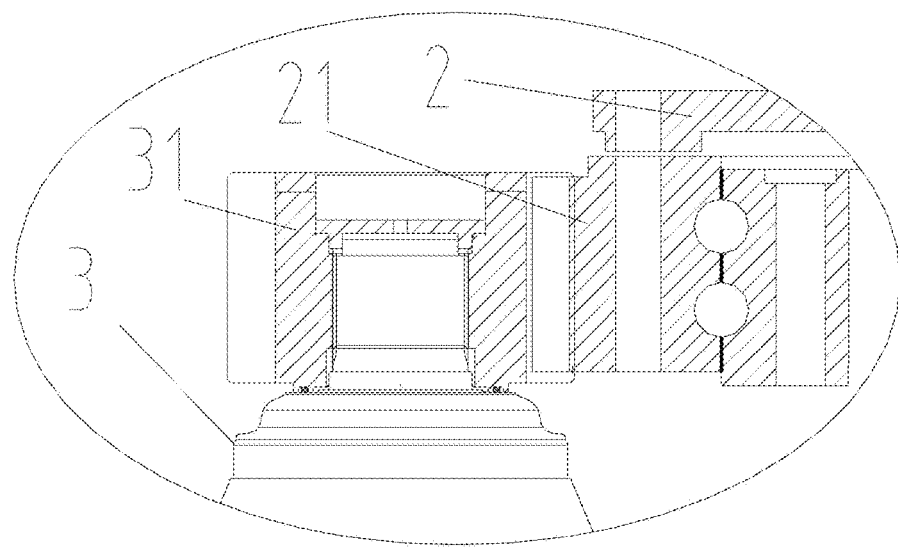
FIG. 3 illustrates a partial enlarged view of the part enclosed by a circle shown in FIG. 2.
Figure 4:
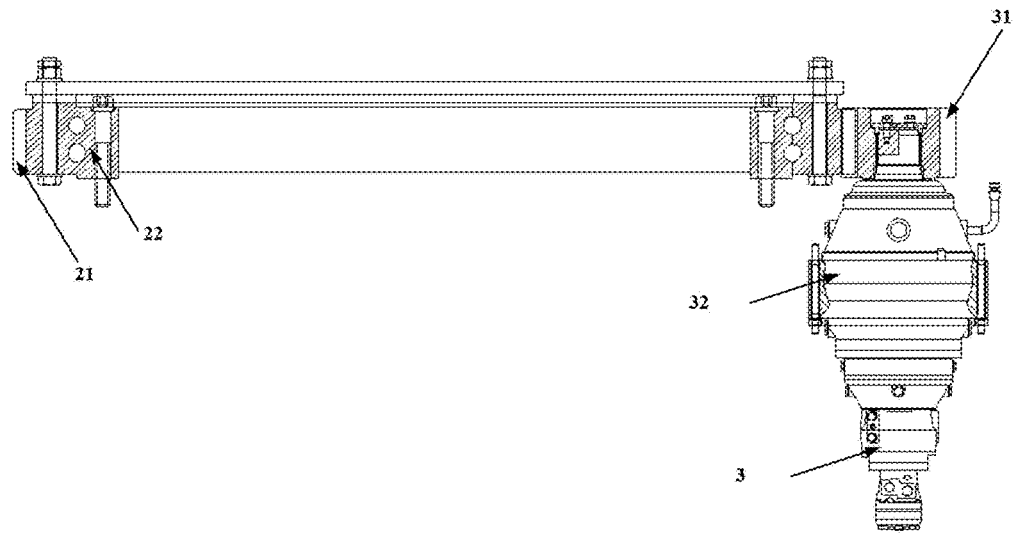
FIG. 4 illustrates a schematic diagram of the connection between the hydraulic motor and the revolving platform in a preferred embodiment of the present invention.

As shown in FIG. 2-4, a revolving actuator with a hydraulic motor is illustrated. As shown in FIG. 2-3, the output shaft of the hydraulic motor 3 drives a first gear 31 fitted over the output shaft to rotate, the first gear 31 engages a second gear 21 (e.g., the revolution supporting outer ring) arranged on the revolving platform 2, and the second gear 21 drives the revolving platform 2 to revolve as it rotates. Through such a driving structure, the movement of the hydraulic motor 3 is transferred to the revolving platform 2, and the revolving platform 2 drives the connected section (i.e., the first section) of the boom 1 to move; the movement of the first section is transferred to the last section 11 in a certain ratio depending on the attitude of the boom 1.

Preferably, a revolving reducer 32 can be arranged between the output shaft of the hydraulic motor 3 and the first gear 31, as shown in FIG. 4; the output speed of the hydraulic motor 3 can be reduced to a speed that is tolerable for the revolving platform 2 via the revolving reducer 32.

Wherein, the action of the hydraulic motor 3 is controlled by a revolving solenoid valve (not shown) through a hydraulic oil circuit; the revolving solenoid valve receives a control signal and controls the action of the hydraulic motor 3 based on the control signal. When the control signal is 0, the valve spool of the revolving solenoid valve is in neutral position; in that state, the hydraulic motor 3 doesn't act, and the revolving platform 2 doesn't revolve. When the control signal is positive or negative, the valve spool of the revolving solenoid valve is in left position or right position accordingly; in that state, the hydraulic motor 3 is driven to rotate in clockwise direction or counter-clockwise direction, and thereby drives the revolving platform 2 to revolve in the revolution direction or in the direction reversed to the revolution direction. For those having ordinary skills in the art, the hydraulic oil circuit that used by the revolving solenoid valve to control the hydraulic motor 3 can be designed and obtained on the basis of above disclosure; therefore, it will not be detailed any more here.

Figure 5:
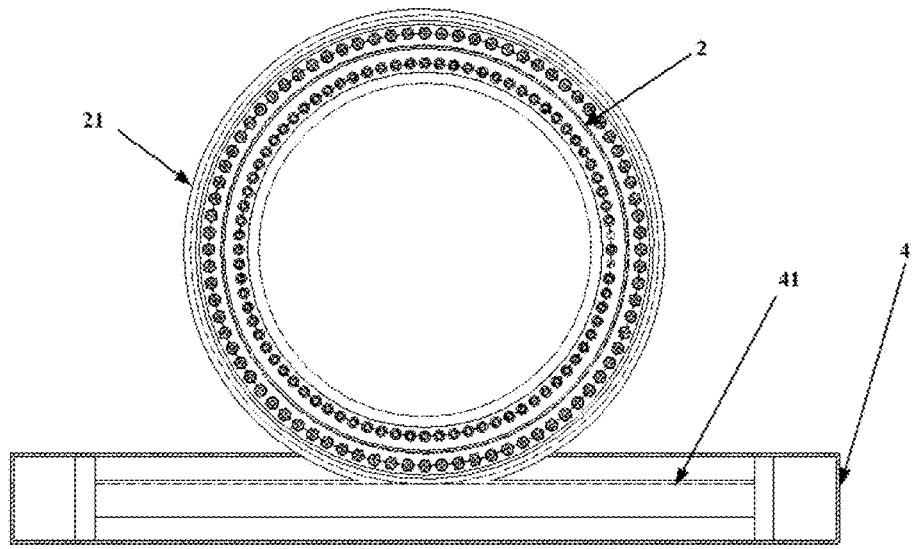
FIG. 5 illustrates a schematic diagram of the connection between the revolving cylinder and the revolving platform in a preferred embodiment of the present invention.

Alternatively, as shown in FIG. 5, a revolving actuator with a revolving cylinder is illustrated. As shown in FIG. 5, the revolving cylinder 4 engages the second gear 21 (i.e., the revolution supporting outer ring) on the revolving platform 2 via the rack 41, and drives the outer revolution supporting ring to rotate. Through such a driving mechanism, the reciprocating rectilinear movement of the revolving cylinder 4 is converted to revolving movement of the platform 2.

Wherein, alternatively, the action of the revolving cylinder 4 can be controlled by a revolving solenoid valve (not shown) through the hydraulic oil circuit; the revolving solenoid valve receives a control signal and controls the action of the revolving cylinder 4 based on the control signal. When the control signal is 0, the valve spool of the revolving solenoid valve is in neutral position; in that state, the revolving cylinder 4 doesn't act, and the revolving platform 2 doesn't revolve. When the control signal is positive or negative, the valve spool of the revolving solenoid valve is in left position or right position accordingly; in that state, the revolving cylinder 4 is driven to move linearly to left or right, and thereby drives the revolving platform 2 to revolve in the revolution direction or in the direction reversed to the revolution direction. For those having ordinary skills in the art, the hydraulic oil circuit that used by the revolving solenoid valve to control the revolving cylinder 4 can be designed and obtained on the basis of above disclosure; therefore, it will not be detailed any more here.

Based on the pump truck structure described above, as shown in FIG. 6, the revolution vibration suppression method for the pump truck boom provided in the present invention comprises:

detecting the vibration severity of the boom 1 in the revolution direction;

extracting the dynamic characteristic parameters of the boom 1;

calculating a control signal that can be used to control the revolving actuator to compensate the vibration severity according to the vibration severity and dynamic characteristic parameters extracted; and driving the revolving actuator according to the control signal to move, to suppress the revolution vibration of the boom 1.

The vibration severity of the boom 1 in the revolution direction can be obtained by detecting a variety of signals that characterize the vibration severity, such as displacement signal, speed signal, acceleration signal, angle signal, or pressure signal, etc. Regarding the vibration severity in the revolution direction, it can be represented in the following forms:

(I) The displacement, the speed, and the acceleration of the boom end in the revolution direction are detected as the vibration severity signal that represents the vibration severity.

(II) The revolution angle, the angular speed, and the angular acceleration of the revolving platform are detected as the vibration severity signal that represents the vibration severity.

(III) The pressure and the pressure difference of the oil inlet/outlet of the revolving actuator (e.g., hydraulic motor or revolving cylinder, etc.) are detected as the vibration severity signal that represents the vibration severity.

All of above forms can be used. When the control signal for suppressing revolution vibration is calculated, different calculation forms can be used, depending on the form of the vibration severity signal, as detailed below.

The dynamic characteristic parameters of the boom include, but are not limited to: amplitude gain k, phase difference $\Delta\phi$, and damping ratio $\xi$, etc., and they can be preset with default values; for example, they can be preset with values that are universal, as determined on the basis of experiments, to produce some revolution vibration suppression effect. However, the dynamic characteristic parameters of the boom may vary, depending on the attitude of the boom; therefore, to attain a better vibration damping effect, the dynamic characteristic parameters of the boom can be slightly changed according to the attitude of the boom.

Figure 6:
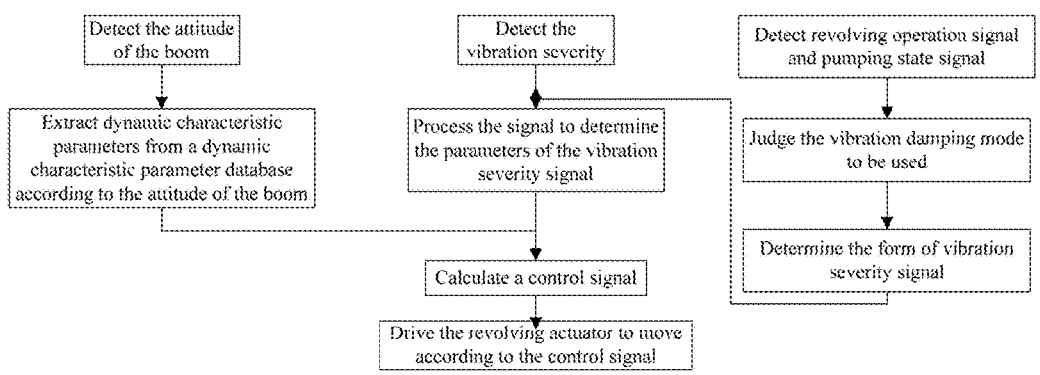
FIG. 6 illustrates a flow chart of the revolution vibration suppression method for the pump truck boom in a preferred embodiment of the present invention.

Therefore, in such a case, preferably, as shown in FIG. 6, the method can further comprises the following step: detecting the current boom attitude; in addition, the step of extracting the dynamic characteristic parameters of the boom can be: extracting the dynamic characteristic parameters from a predefined dynamic characteristic parameter database, according to the detected current boom attitude.

It should be noted that the dynamic characteristic parameter database described in the present invention refers to a matrix of dynamic characteristic parameters of the sections predefined on the basis of different boom attitudes, wherein, each element in the matrix corresponds to the dynamic characteristic parameters in the corresponding boom attitude respectively, including, but not limited to amplitude gain k, phase difference $\Delta\phi$, and damping ratio $\xi$, etc. The database can be set up based on the experimental data obtained in vibration tests (e.g., modal tests) and the training with empirical values, or the theoretical analysis by setting up a kinetic model of the boom revolution system, or the parameter values that are set under actual operating conditions, all of which can be understood and implemented by those skilled in the art. Therefore, the dynamic characteristic parameters extracted according to the current boom attitude are closer to those in the actual situation. In addition, the control signal for the revolving actuator can be calculated and obtained more accurately, on the basis of the vibration severity of the sections, in conjunction with the dynamic characteristics of the boom; thus, the vibration of the boom in the revolution direction can be dampened quickly.

Preferably, the detected current boom attitude can be inclinations of the sections in relation to the horizontal plane or the vertical plane or the included angles between adjacent sections; usually, the inclinations in relation to the horizontal plane are used.

After the vibration severity and dynamic characteristic parameters are obtained, the control signal for the revolving actuator can be calculated. The control signal will be used to compensate the vibration severity and thereby suppress the vibration of the boom in the revolution direction to some degree.

There is no restriction on the calculation method of the control signal in the present invention, as long as a control signal that can be used to compensate the vibration severity is obtained according to the vibration severity and dynamic characteristic parameters. For example, the following calculation method can be used:

establishing a model of the vibration severity signal first;

analyzing the actual vibration severity signal detected, to obtain a functional expression of the actual vibration severity signal;

calculating the control signal according to the functional expression of the actual vibration severity signal, so that the vibration compensation signal excited by the control signal can decrease the amplitude of the actual vibration severity signal. Preferably, the sum of the vibration compensation signal excited by the control signal and the actual vibration severity signal is zero. That step can be accomplished as follows: calculating the functional expression of a vibration compensation signal that can be added with the actual vibration severity signal to get zero; calculating the control signal on the basis of an excitation response transfer function of the vibration of the boom, with the functional expression of the vibration compensation signal as response and the control signal for controlling the revolving actuator as an exciter. Wherein, the excitation response transfer function of the vibration of the boom can be obtained through a large quantity of experiments.

Hereunder a calculation method that establishes a model and calculates the control signal according to the causes of the vibration will be introduced.

Through long-term and extensive experimental study, the inventor of the present invention has found: in the construction operation process of a pump truck, the causes that result in vibration of the pump truck boom in the revolution direction are mainly in three aspects. Hereunder the vibration resulted from each cause in the three aspect will be modeled, to obtain the form of the vibration severity signal:

(1) Inertial Effect of the Boom at a Sudden Stop of Revolving Operation

When the pump truck operator manipulates the revolving mechanism to revolve the boom to a specified construction position and stops the revolution of the boom, the boom will have reciprocating revolution vibration near the equilibrium position at the time of sudden stop owing to its heavy inertia. That vibration is damped with time. The vibration model can be in one of the following forms, depending on the form of the vibration severity signal (e.g., different forms of vibration severity signal can be distinguished with $y_1(t)$, $\tilde{y}_1(t)$, and $\hat{y}_1(t)$ respectively):

(I) Use the displacement signal, speed signal, or acceleration signal of the boom end in the revolution direction as the vibration severity signal that represents the vibration severity:

$$y_1(t) = \sum_{i=1}^{n} B_{1i} e^{-\xi_i \omega_i t} \sin(\omega_i t + \alpha_{1i}) \quad \text{Equation (1)}$$

where, $y_1(t)$ is the vibration severity signal, $B_{1i}$ is the vibration amplitude in the $i^{th}$ order revolution mode, $\xi_i$ is the damping ratio of the boom in the $i^{th}$ order revolution mode, $\omega_i$ is the vibration frequency of the boom in the $i^{th}$ order revolution mode, $\alpha_{1i}$ is the phase in the $i^{th}$ order revolution mode, and n is the order of modes, which can be determined as 1 or 2, according to the required simulation accuracy.

(II) Use the revolution angle signal, angular speed signal, or angular acceleration signal of the revolving platform as the vibration severity signal that represents the vibration severity:

$$\tilde{y}_1(t) = \sum_{i=1}^{n} \tilde{B}_{1i} e^{-\xi_i \omega_i t} \sin(\omega_i t + \tilde{\alpha}_{1i}) \quad \text{Equation (2)}$$

where, $\tilde{y}_1(t)$ is the vibration severity signal, $\tilde{B}_{1i}$ is the vibration amplitude in the $i^{th}$ order revolution mode, $\xi_i$ is the damping ratio of the boom in the $i^{th}$ order revolution mode, $\omega_i$ is the vibration frequency of the boom in the $i^{th}$ order revolution mode, $\tilde{\alpha}_{1i}$ is the phase in the $i^{th}$ order revolution mode, and n is the order of modes, which can be determined as 1 or 2, according to the required simulation accuracy.

(III) Use the oil inlet/outlet pressure signal or pressure difference signal of the revolving actuator to represent the vibration severity signal:

$$\hat{y}_1(t) = \sum_{i=1}^{n} \hat{B}_{1i} e^{-\xi_i \omega_i t} \sin(\omega_i t + \hat{\alpha}_{1i}) \quad \text{Equation (3)}$$

where, $\hat{y}_1(t)$ is the vibration severity signal, $\hat{B}_{1i}$ is the vibration amplitude in the $i^{th}$ order revolution mode, $\xi_i$ is the damping ratio of the boom in the $i^{th}$ order revolution mode, $\omega_i$ is the vibration frequency of the boom in the $i^{th}$ order revolution mode, $\hat{\alpha}_{1i}$ is the phase in the $i^{th}$ order revolution mode, and n is the order of modes, which can be determined as 1 or 2, according to the required simulation accuracy.

(2) Concrete Flow Impact in Concrete Pumping Process

In the pumping process, as the concrete cylinder alternates pumping operation and direction reversing operation cyclically or the transfer pipeline changes direction horizontally, the concrete flow in the transfer pipeline of the pump truck boom may be discontinuous or change in flow direction, causing heavy horizontal impulse impact, which are a major excitation source for revolution vibration of the boom. For example, in the present twin-cylinder concrete pumping mechanism, when the piston of one concrete cylinder completes concrete pumping, the distribution valve will reverse in direction and the concrete flow will be in stopped state for some duration; once the direction reversal is completed, the piston of the other concrete cylinder will begin to pump the concrete, and thereby the concrete will begin to flow again. The repetitive concrete pumping process results in periodic force from the concrete to the boom. On the basis of Fourier decomposition of a periodic signal, it is known that the periodic concrete flow impact can be expressed as $$f(t) = \sum_{i=1}^{n} A_i \sin(\omega_i t + \theta_i).$$

The periodic concrete flow impact will result in forced reciprocating revolution vibration of the boom near the equilibrium position. The forced vibration model can be in one of the following forms, depending on the form of the vibration severity signal:

(I) Use the displacement signal, speed signal, or acceleration signal of the boom end in the revolution direction to represent the vibration severity signal:

$$y_2(t) = \sum_{i=1}^{n} B_{2i} \sin(\omega_i t + \alpha_{2i}) \quad \text{Equation (4)}$$

where, $y_2(t)$ is the vibration severity signal, $B_{2i}$ is the vibration amplitude in the $i^{th}$ order revolution mode, $\omega_i$ is the vibration frequency of the boom in the $i^{th}$ order revolution mode, $\alpha_{2i}$ is the phase in the $i^{th}$ order revolution mode, and n is the order of modes, which can be determined as 1 or 2, according to the required simulation accuracy.

(II) Use the revolution angle signal, angular speed signal, or angular acceleration signal of the revolving platform to represent the vibration severity signal:

$$\tilde{y}_2(t) = \sum_{i=1}^{n} \tilde{B}_{2i} \sin(\omega_i t + \tilde{\alpha}_{2i}) \quad \text{Equation (5)}$$

where, $\tilde{y}_2(t)$ is the vibration severity signal, $\tilde{B}_{2i}$ is the vibration amplitude in the $i^{th}$ order revolution mode, $\omega_i$ is the vibration frequency of the boom in the $i^{th}$ order revolution mode, $\tilde{\alpha}_{2i}$ is the phase in the $i^{th}$ order revolution mode, and n is the order of modes, which can be determined as 1 or 2, according to the required simulation accuracy.

(III) Use the pressure signal or pressure difference signal of the oil inlet/outlet of the revolving actuator to represent the vibration severity signal:

$$\hat{y}_2(t) = \sum_{i=1}^{n} \hat{B}_{2i} \sin(\omega_i t + \hat{\alpha}_{2i}) \quad \text{Equation (6)}$$

where, $\hat{y}_2(t)$ is the vibration severity signal, $\hat{B}_{2i}$ is the vibration amplitude in the $i^{th}$ order revolution mode, $\omega_i$ is the vibration frequency of the boom in the $i^{th}$ order revolution mode, $\hat{\alpha}_{2i}$ is the phase in the order revolution mode, and n is the order of modes, which can be determined as 1 or 2, according to the required simulation accuracy.

(3) Combined Action of the Concrete Flow Impact and the Inertia Force of Boom at Sudden Stop of Revolution Operation in the Pumping Process In this case, the vibration model resulted from the combined action is the combined result of the exciting actions in equation (1) and (2), i.e., it can be in one of the following forms, depending on the form of the vibration severity signal:

(I) Use the displacement signal, speed signal, or acceleration signal of the boom end in the revolution direction to represent the vibration severity signal:

$$y_3(t) = y_1(t) + y_2(t) = \sum_{i=1}^{n} B_{1i} e^{-\xi_i \omega_i t} \sin(\omega_i t + \alpha_{1i}) + \sum_{i=1}^{n} B_{2i} \sin(\omega_i t + \alpha_{2i}) \quad \text{Equation (7)}$$

where, $y_3(t)$ is the vibration severity signal, and other parameters are the same as those described above.

(II) Use the revolution angle signal, angular speed signal, or angular acceleration signal of the revolving platform to represent the vibration severity signal:

$$\tilde{y}_3(t) = \tilde{y}_1(t) + \tilde{y}_2(t) = \sum_{i=1}^{n} \tilde{B}_{1i} e^{-\xi_i \omega_i t} \sin(\omega_i t + \tilde{\alpha}_{1i}) + \sum_{i=1}^{n} \tilde{B}_{2i} \sin(\omega_i t + \tilde{\alpha}_{2i}) \quad \text{Equation (8)}$$

where, $\tilde{y}_3(t)$ is the vibration severity signal, and other parameters are the same as those described above.

(III) Use the pressure signal or pressure difference signal of the oil inlet/outlet of the revolving actuator to represent the vibration severity signal:

$$\hat{y}_3(t) = \hat{y}_1(t) + \hat{y}_2(t) = \sum_{i=1}^{n} \hat{B}_{1i} e^{-\xi_i \omega_i t} \sin(\omega_i t + \hat{\alpha}_{1i}) + \sum_{i=1}^{n} \hat{B}_{2i} \sin(\omega_i t + \hat{\alpha}_{2i}) \quad \text{Equation (9)}$$

where, $\hat{y}_3(t)$ is the vibration severity signal, $B_{1i}$ is the vibration amplitude in the $i^{th}$ order first revolution mode, $B_{2i}$ is the vibration amplitude in the $i^{th}$ order second revolution mode, $\xi_i$ is the damping ratio of the boom in the $i^{th}$ order revolution mode, $\omega_i$ is the vibration frequency of the boom in the $i^{th}$ order revolution mode, $\alpha_{1i}$ is the phase in the $i^{th}$ order first revolution mode, $\alpha_{2i}$ is the phase in the $i^{th}$ order second revolution mode, and n is the order of modes.

When the corresponding vibration severity signal is detected after a model of the vibration severity signal is established through the analysis of vibration causes as described above, the time domain characteristics and frequency domain characteristics of the detected vibration severity signal (waveform) can be analyzed, to determine the parameters in the signal form. Then, the control signal can be calculated according to the dynamic characteristic parameters of the boom. That is to say, the equation of the control signal for compensating the vibration severity can be obtained by determining the equation of the vibration severity signal. Theoretically, to completely eliminate the vibration, the sum of the vibration severity signal and another vibration signal excited by the control signal should be 0.

From the analysis of the causes for vibration described above, it is seen that the vibration generated at a sudden stop or in the pumping process is severe. Therefore, it is necessary to exercise revolution vibration suppression control, especially when the pump truck is in suddenly stopped state or pumping state. In such a case, preferably specific vibration damping modes should be used for different operating modes. The operating modes include: (1) sudden stop of revolution in non-pumping process; (2) pumping without revolution; (3) sudden stop of revolution in pumping process; (4) revolution without pumping.

Preferably, the method provided in the present invention further comprises the following steps: detecting the revolution operation signal and pumping state signal; judging the operating mode of the pump truck according to the revolution operation signal and pumping state signal, with reference to Table 1. Wherein, the revolution operation signal is an electrical signal from a revolution handle of an remote controller or a handle of revolution selector valve in an electric control cabinet of the pump truck, and reflects whether the revolution operation is being performed; the pumping state signal is an electrical signal of reversing frequency from a pumping handle of the remote controller, a proximity switch of the pumping mechanism, or a solenoid valve of the pumping mechanism, and reflects whether the pumping operation is being performed.

TABLE 1

| Revolution Operation Signal | Pumping State Signal | Operating Mode | Vibration Damping Mode |
|---|---|---|---|
| ON to OFF | OFF | Sudden stop of revolution in non-pumping process | Vibration damping mode 1 |
| OFF | ON | Pumping without revolution | Vibration damping mode 2 |
| ON to OFF | ON | Sudden stop of revolution in pumping process | Vibration damping mode 3 |
| ON | OFF | Revolution without pumping | Vibration damping mode 4 |

In different operating modes, the principal exciting vibration source is different; therefore, the calculation method of the control signal is different, depending on the different vibration damping mode. Hereunder the calculation of the control signal in different vibration damping modes will be introduced. It should be noted that the vibration clamping modes described below may not be used in combination in order to attain certain vibration damping effect, which is to say, they can be used separately; in addition, the present invention is not limited to these vibration damping modes.

Vibration damping mode 1: i.e., vibration damping control at sudden stop in non-pumping process. In this operating mode, the principal exciting vibration source is the cause (1) described above, i.e., the inertial effect of the boom at sudden stop of revolution; therefore, the vibration severity signal should be in the form of $y_1(t)$, $\tilde{y}_1(t)$, or $\hat{y}_1(t)$. Thus, time domain and frequency domain analysis can be made to the detected vibration severity signal according to the form of $y_1(t)$, $\tilde{y}_1(t)$, or $\hat{y}_1(t)$, to determine the time domain and frequency domain characteristic parameters ($B_{1i}/\tilde{B}_{1i}/\hat{B}_{1i}$, $\omega_i$, $\alpha_{1i}/\tilde{\alpha}_{1i}/\hat{\alpha}_{1i}$, $\xi_i$), so as to determine $y_1(t)$, $\tilde{y}_1(t)$, or $\hat{y}_1(t)$. In addition, corresponding dynamic characteristic parameters (amplitude gain $k_i/\tilde{k}_i/\hat{k}_i$ (amplitude gains respective for the three forms of vibration severity signal), phase difference $\Delta\phi_i/\Delta\tilde{\phi}_i/\Delta\hat{\phi}_i$ (phase differences respective for the three forms of vibration severity signal), and damping ratio $\xi_i$, etc.) can be extracted from the dynamic characteristic parameter database, according to the current boom attitude. The damping ratio $\xi_i$ can be extracted from the dynamic characteristic parameter database or determined according to the vibration severity signal. Then, the control signal can be calculated with one of the following equations, depending on the form of the vibration severity signal.

$$i_1(t) = \sum_{i=1}^{n} \frac{1}{k_i} B_{1i} e^{-\xi_i \omega_i t} \sin(\omega_i t + \alpha_{1i} + \Delta\varphi_i + \pi) \quad \text{Equation (10)}$$

$$\tilde{i}_1(t) = \sum_{i=1}^{n} \frac{1}{\tilde{k}_i} \tilde{B}_{1i} e^{-\xi_i \omega_i t} \sin(\omega_i t + \tilde{\alpha}_{1i} + \Delta\tilde{\varphi}_i + \pi) \quad \text{Equation (11)}$$

$$\hat{i}_1(t) = \sum_{i=1}^{n} \frac{1}{\hat{k}_i} \hat{B}_{1i} e^{-\xi_i \omega_i t} \sin(\omega_i t + \hat{\alpha}_{1i} + \Delta\hat{\varphi}_i + \pi) \quad \text{Equation (12)}$$

where, $i_1(t)$, $\tilde{i}_1(t)$, and $\hat{i}_1(t)$ are the three forms of the control signal respectively for $y_1(t)$, $\tilde{y}_1(t)$, and $\hat{y}_1(t)$; and other parameter are defined in the same way described above.

The control signal calculated above will be used to drive the revolving actuator to act and thereby apply an active vibration damping control force to the boom; the vibration of the boom resulted from the force can be expressed as:

$$z_1(t) = \sum_{i=1}^{n} k_i \frac{1}{k_i} B_{1i} e^{-\xi_i \omega_i t} \sin(\omega_i t + \alpha_{1i} + \Delta\phi_i - \Delta\phi_i + \pi) = \quad \text{Equation (13)}$$

$$\sum_{i=1}^{n} B_{1i} e^{-\xi_i \omega_i t} \sin(\omega_i t + \alpha_{1i} + \pi)$$

$$\tilde{z}_1(t) = \sum_{i=1}^{n} \tilde{k}_i \frac{1}{\tilde{k}_i} \tilde{B}_{1i} e^{-\xi_i \omega_i t} \sin(\omega_i t + \tilde{\alpha}_{1i} + \Delta\tilde{\phi}_i - \Delta\tilde{\phi}_i + \pi) = \quad \text{Equation (14)}$$

$$\sum_{i=1}^{n} \tilde{B}_{1i} e^{-\xi_i \omega_i t} \sin(\omega_i t + \tilde{\alpha}_{1i} + \pi)$$

$$\hat{z}_1(t) = \sum_{i=1}^{n} \hat{k}_i \frac{1}{\hat{k}_i} \hat{B}_{1i} e^{-\xi_i \omega_i t} \sin(\omega_i t + \hat{\alpha}_{1i} + \Delta\hat{\phi}_i - \Delta\hat{\phi}_i + \pi) = \quad \text{Equation (15)}$$

$$\sum_{i=1}^{n} \hat{B}_{1i} e^{-\xi_i \omega_i t} \sin(\omega_i t + \hat{\alpha}_{1i} + \pi)$$

$z_1(t)$, $\tilde{z}_1(t)$, and $\hat{z}_1(t)$ are vibrations resulted from $i_1(t)$, $\tilde{i}_1(t)$ and $\hat{i}_1(t)$ respectively.

$z_1(t)$ has the same amplitude value as the vibration $y_1(t)$ of the boom in the revolution direction resulted from the inertia force at sudden stop, but is opposite in phase. Ideally, the sum $y_1(t)+z_1(t)$ of them is zero, i.e., the boom end will enter into static state quickly in the revolution direction after the vibration damping control is applied.

$\tilde{z}_1(t)$ has the same amplitude value as the vibration $\tilde{y}_1(t)$ of the revolving platform resulted from the inertia force at sudden stop, but is opposite in phase. Ideally, the sum $\tilde{y}_1(t)+\tilde{z}_1(t)$ of them is zero, i.e., the boom end will enter into static state quickly in the revolution direction after the vibration damping control is applied.

$\hat{z}_1(t)$ has the same amplitude value as the pressure or pressure difference $\hat{y}_1(t)$ of the oil inlet/outlet of the revolving actuator resulted from the inertia force in the revolution direction at sudden stop, but is opposite in phase. Ideally, the sum $\hat{y}_1(t)+\hat{z}_1(t)$ of them is zero, i.e., the boom end will enter into static state quickly in the revolution direction after the vibration damping control is applied.

Figure 7:
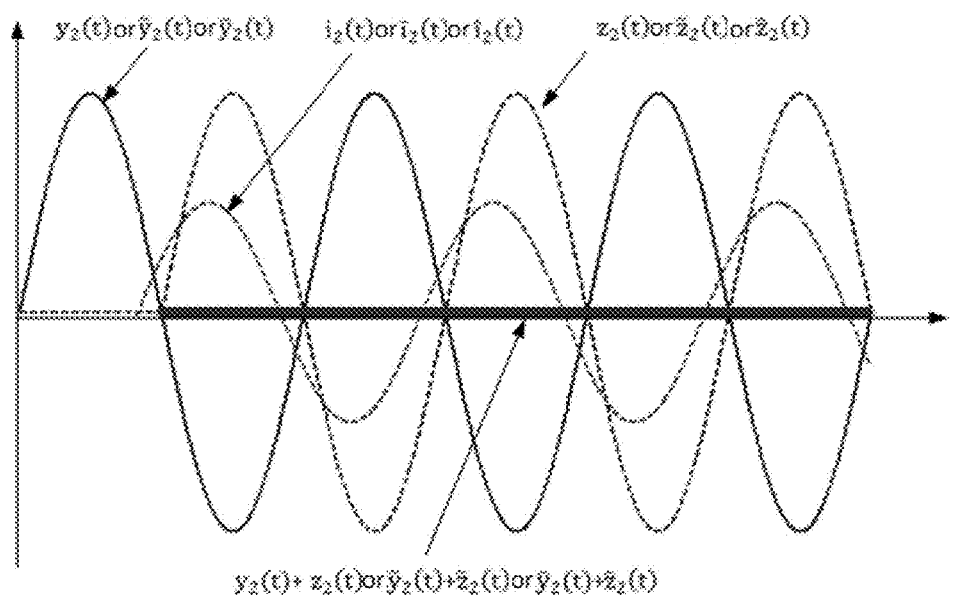
FIG. 7 illustrates a signal oscillogram of the vibration damping mode 1 in the present invention.

Please see FIG. 7, which illustrates the oscillograms of $y_1(t)$, (or $\tilde{y}_1(t)$, $\hat{y}_1(t)$), $i_1(t)$ (or $\tilde{i}_1(t)$, $\hat{i}_1(t)$), $z_1(t)$ (or $\tilde{z}_1(t)$, $\hat{z}_1(t)$), and $y_1(t)+z_1(t)$ (or $\tilde{y}_1(t)+\tilde{z}_1(t)$, $\hat{y}_1(t)+\hat{z}_1(t)$). It is seen from FIG. 7: $z_1(t)$ has the same amplitude value as $y_1(t)$ but is opposite in phase, and the sum $y_1(t)+z_1(t)$ of them is approximately zero. The other forms of vibration severity signal are similar to that case.

Vibration damping mode 2: i.e., vibration damping control in concrete pumping process. In this operating mode, the principal exciting vibration source is the cause (2) described above, i.e., the concrete flow impact in the concrete pumping process; therefore, the vibration severity signal should be in the form of $y_2(t)$, $\tilde{y}_2(t)$, or $\hat{y}_2(t)$. Thus, the time domain analysis and the frequency domain analysis can be made to the detected vibration severity signal according to the form of $y_2(t)$, $\tilde{y}_2(t)$, or $\hat{y}_2(t)$, to determine the time domain and the frequency domain characteristic parameters ($B_{2i}/\tilde{B}_{2i}/\hat{B}_{2i}$, $\omega_i$, $\alpha_{2i}/\tilde{\alpha}_{2i}/\hat{\alpha}_{2i}$), so as to determine $y_2(t)$, $\tilde{y}_2(t)$, or $\hat{y}_2(t)$. In addition, corresponding dynamic characteristic parameters (amplitude gain $k_i/\tilde{k}_i/\hat{k}_i$, phase difference $\Delta\phi_i/\Delta\tilde{\phi}_i/\Delta\hat{\phi}_i$, etc.) can be extracted from the dynamic characteristic parameter database, according to the current boom attitude. Then, the control signal can be calculated with one of the following equations, depending on the form of the vibration severity signal.

$$i_2(t) = \sum_{i=1}^{n} \frac{1}{k_i} B_{2i} \sin(\omega_i t + \alpha_{2i} + \Delta\varphi_i + \pi) \quad \text{Equation (16)}$$

$$\tilde{i}_2(t) = \sum_{i=1}^{n} \frac{1}{\tilde{k}_i} \tilde{B}_{2i} \sin(\omega_i t + \tilde{\alpha}_{2i} + \Delta\tilde{\varphi}_i + \pi) \quad \text{Equation (17)}$$

$$\hat{i}_2(t) = \sum_{i=1}^{n} \frac{1}{\hat{k}_i} \hat{B}_{2i} \sin(\omega_i t + \hat{\alpha}_{2i} + \Delta\hat{\varphi}_i + \pi) \quad \text{Equation (18)}$$

where, $i_2(t)$, $\tilde{i}_2(t)$, and $\hat{i}_2(t)$ are the three forms of the control signal respectively for $y_2(t)$, $\tilde{y}_2(t)$, and $\hat{y}_2(t)$; and other parameter are defined in the same way described above.

The control signal calculated above will be used to drive the revolving actuator to act and thereby apply an active vibration damping control force to the boom: the vibration of the boom resulted from the force can be expressed as:

$$z_2(t) = \sum_{i=1}^{n} k_i \frac{1}{k_i} B_{2i} \sin(\omega_i t + \alpha_{2i} + \Delta\phi_i - \Delta\phi_i + \pi) = \quad \text{Equation (19)}$$

$$\sum_{i=1}^{n} B_{2i} \sin(\omega_i t + \alpha_{2i} + \pi)$$

$$\tilde{z}_2(t) = \sum_{i=1}^{n} \tilde{k}_i \frac{1}{\tilde{k}_i} \tilde{B}_{2i} \sin(\omega_i t + \tilde{\alpha}_{2i} + \Delta\tilde{\phi}_i - \Delta\tilde{\phi}_i + \pi) = \quad \text{Equation (20)}$$

$$\sum_{i=1}^{n} \tilde{B}_{2i} \sin(\omega_i t + \tilde{\alpha}_{2i} + \pi)$$

-continued $$\hat{z}_2(t) = \sum_{i=1}^{n} \hat{k}_i \frac{1}{\hat{k}_i} \hat{B}_{2i} \sin(\omega_i t + \hat{\alpha}_{2i} + \Delta \hat{\phi}_i - \Delta \hat{\phi}_i + \pi) =$$ Equation (21)

$$\sum_{i=1}^{n} \hat{B}_{2i} \sin(\omega_i t + \hat{\alpha}_{2i} + \pi)$$

$z_2(t)$, $\tilde{z}_2(t)$, and $\hat{z}_2(t)$ are vibrations resulted from $i_2(t)$, $\tilde{i}_2(t)$, and $\hat{i}_2(t)$ respectively.

$z_2(t)$ has the same amplitude value as the vibration $y_2(t)$ of the boom in the revolution direction resulted from the concrete pumping impact at sudden stop, but is opposite in phase. Ideally, the sum $y_2(t)+z_2(t)$ of them is zero, i.e., the boom end will enter into static state quickly in the revolution direction after the vibration damping control is applied.

$\tilde{z}_2(t)$ has the same amplitude value as the vibration $\tilde{y}_2(t)$ of the revolving platform resulted from the concrete pumping impact in the revolution direction at sudden stop, but is opposite in phase. Ideally, the sum $\tilde{y}_2(t)+\tilde{z}_2(t)$ of them is zero, i.e., the boom end will enter into static state quickly in the revolution direction after the vibration damping control is applied.

$\hat{z}_2(t)$ has the same amplitude value as the oil inlet/outlet pressure or pressure difference $\hat{y}_2(t)$ of the revolving actuator resulted from the concrete pumping impact in the revolution direction at sudden stop, but is opposite in phase. Ideally, the sum $\hat{y}_2(t)+\hat{z}_2(t)$ of them is zero, i.e., the boom end will enter into static state quickly in the revolution direction after the vibration damping control is applied.

Figure 8:
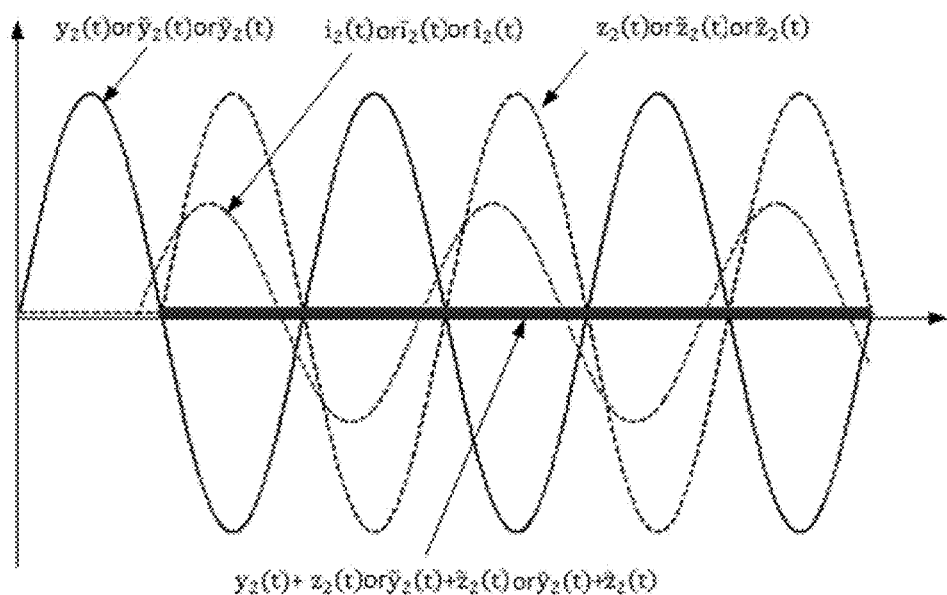
FIG. 8 illustrates a signal oscillogram of the vibration damping mode 2 in the present invention.

Please see FIG. 8, which illustrates the oscillograms of $y_2(t)$ (or $\tilde{y}_2(t)$, $\hat{y}_2(t)$), $i_2(t)$ (or $\tilde{i}_2(t)$, $\hat{i}_2(t)$), $z_2(t)$ (or $\tilde{z}_2(t)$, $\hat{z}_2(t)$), and $y_2(t)+z_2(t)$ (or $\tilde{y}_2(t)+\tilde{z}_2(t)$, $\hat{y}_2(t)+\hat{z}_2(t)$). It is seen from FIG. 8: $z_2(t)$ has the same amplitude value as $y_2(t)$ but is opposite in phase, and the sum $y_2(t)+z_2(t)$ of them is approximately zero. The other forms of vibration severity signal are similar to that case.

Vibration damping mode 3: i.e., vibration damping control at sudden stop of revolution in concrete pumping process. In this operating mode, the principal exciting vibration source is the cause (3) described above, i.e., the combined action of concrete flow impact and inertia force of boom at sudden stop in the concrete pumping process; therefore, the vibration severity signal should be in the form of $y_3(t)$, $\tilde{y}_3(t)$, or $\hat{y}_3(t)$. Thus, the time domain analysis and the frequency domain analysis can be made to the detected vibration severity signal according to the form of $y_3(t)$, $\tilde{y}_3(t)$, or $\hat{y}_3(t)$, to determine the time domain and the frequency domain characteristic parameters ($B_{1i}/\tilde{B}_{1i}/\hat{B}_{1i}$, $B_{2i}/\tilde{B}_{2i}/\hat{B}_{2i}$, $\omega_i$, $\alpha_{1i}/\tilde{\alpha}_{1i}/\hat{\alpha}_{1i}$, $\alpha_{2i}/\tilde{\alpha}_{2i}/\hat{\alpha}_{2i}$, $\xi_i$), so as to determine $y_3(t)$, $\tilde{y}_3(t)$, or $\hat{y}_3(t)$. In addition, corresponding dynamic characteristic parameters (amplitude gain $k_i/\tilde{k}_i/\hat{k}_i$, phase difference $\Delta\phi_i/\Delta\tilde{\phi}_i/\Delta\hat{\phi}_i$, damping ratio $\xi_i$, etc.) can be extracted from the dynamic characteristic parameter database, according to the current boom attitude. The damping ratio $\xi_i$ can be extracted from the dynamic characteristic parameter database or determined according to the vibration severity signal. Then, the control signal can be calculated with one of the following equations, depending on the form of the vibration severity signal.

$$i_3(t) = \sum_{i=1}^{n} \frac{1}{k_i} B_{1i} e^{-\xi_i \omega_i t} \sin(\omega_i t + \alpha_{1i} + \Delta\phi_i + \pi) +$$ Equation (22)

$$\sum_{i=1}^{n} \frac{1}{k_i} B_{2i} \sin(\omega_i t + \alpha_{2i} + \Delta\phi_i + \pi)$$

$$\tilde{i}_3(t) = \sum_{i=1}^{n} \frac{1}{\tilde{k}_i} \tilde{B}_{1i} e^{-\xi_i \omega_i t} \sin(\omega_i t + \tilde{\alpha}_{1i} + \Delta\tilde{\phi}_i + \pi) +$$ Equation (23)

$$\sum_{i=1}^{n} \frac{1}{\tilde{k}_i} \tilde{B}_{2i} \sin(\omega_i t + \tilde{\alpha}_{2i} + \Delta\tilde{\phi}_i + \pi)$$

$$\hat{i}_3(t) = \sum_{i=1}^{n} \frac{1}{\hat{k}_i} \hat{B}_{1i} e^{-\xi_i \omega_i t} \sin(\omega_i t + \hat{\alpha}_{1i} + \Delta\hat{\phi}_i + \pi) +$$ Equation (24)

$$\sum_{i=1}^{n} \frac{1}{\hat{k}_i} \hat{B}_{2i} \sin(\omega_i t + \hat{\alpha}_{2i} + \Delta\hat{\phi}_i + \pi)$$

where, $i_3(t)$, $\tilde{i}_3(t)$, and $\hat{i}_3(t)$ are the three forms of the control signal respectively for $y_3(t)$, $\tilde{y}_3(t)$, and $\hat{y}_3(t)$; and other parameter are defined in the same way described above.

The control signal calculated above will be used to drive the revolving actuator to act and thereby apply an active vibration damping control force to the boom; the vibration of the boom resulted from the force can be expressed as:

$$z_3(t) = \sum_{i=1}^{n} k_i \frac{1}{k_i} B_{1i} e^{-\xi_i \omega_i t} \sin(\omega_i t + \alpha_{1i} + \Delta\phi_i - \Delta\phi_i + \pi) +$$ Equation (25)

$$\sum_{i=1}^{n} k_i \frac{1}{k_i} B_{2i} \sin(\omega_i t + \alpha_{2i} + \Delta\phi_i - \Delta\phi_i + \pi) =$$

$$\sum_{i=1}^{n} B_{1i} e^{-\xi_i \omega_i t} \sin(\omega_i t + \alpha_{1i} + \pi) +$$

$$\sum_{i=1}^{n} B_{2i} \sin(\omega_i t + \alpha_{2i} + \pi)$$

$$\tilde{z}_3(t) = \sum_{i=1}^{n} \tilde{k}_i \frac{1}{\tilde{k}_i} \tilde{B}_{1i} e^{-\xi_i \omega_i t} \sin(\omega_i t + \tilde{\alpha}_{1i} + \Delta\tilde{\phi}_i - \Delta\tilde{\phi}_i + \pi) +$$ Equation (26)

$$\sum_{i=1}^{n} \tilde{k}_i \frac{1}{\tilde{k}_i} \tilde{B}_{2i} \sin(\omega_i t + \tilde{\alpha}_{2i} + \Delta\tilde{\phi}_i - \Delta\tilde{\phi}_i + \pi) =$$

$$\sum_{i=1}^{n} \tilde{B}_{1i} e^{-\xi_i \omega_i t} \sin(\omega_i t + \tilde{\alpha}_{1i} + \pi) +$$

$$\sum_{i=1}^{n} \tilde{B}_{2i} \sin(\omega_i t + \tilde{\alpha}_{2i} + \pi)$$

$$\hat{z}_3(t) = \sum_{i=1}^{n} \hat{k}_i \frac{1}{\hat{k}_i} \hat{B}_{1i} e^{-\xi_i \omega_i t} \sin(\omega_i t + \hat{\alpha}_{1i} + \Delta\hat{\phi}_i - \Delta\hat{\phi}_i + \pi) +$$ Equation (27)

$$\sum_{i=1}^{n} \hat{k}_i \frac{1}{\hat{k}_i} \hat{B}_{2i} \sin(\omega_i t + \hat{\alpha}_{2i} + \Delta\hat{\phi}_i - \Delta\hat{\phi}_i + \pi) =$$

$$\sum_{i=1}^{n} \hat{B}_{1i} e^{-\xi_i \omega_i t} \sin(\omega_i t + \hat{\alpha}_{1i} + \pi) +$$

$$\sum_{i=1}^{n} \hat{B}_{2i} \sin(\omega_i t + \hat{\alpha}_{2i} + \pi)$$

$z_3(t)$, $\tilde{z}_3(t)$, and $\hat{z}_3(t)$ are vibrations resulted from $i_3(t)$, $\tilde{i}_3(t)$, and $\hat{i}_3(t)$, respectively.

$z_3(t)$ has the same amplitude value as the vibration $y_3(t)$ of the boom in the revolution direction resulted from the combined action of the concrete pumping impact and inertia force of boom at sudden stop, but is opposite in phase. Ideally, the sum $y_3(t)+z_3(t)$ of them is zero, i.e., the boom end will enter into static state quickly in the revolution direction after the vibration damping control is applied.

$\tilde{z}_3(t)$ has the same amplitude value as the vibration $\tilde{y}_3(t)$ of the revolving platform resulted from the combined action of the concrete pumping impact and inertia force of boom in the revolution direction at sudden stop, but is opposite in phase. Ideally, the sum $\tilde{y}_3(t)+\tilde{z}_3(t)$ of them is zero, i.e., the boom end will enter into static state quickly in the revolution direction after the vibration damping control is applied.

$\hat{z}_3(t)$ has the same amplitude value as the oil inlet/outlet pressure or pressure difference $\hat{y}_3(t)$ of the revolving actuator resulted from the combined action of the concrete pumping impact and inertia force of boom in the revolution direction at sudden stop, but is opposite in phase. Ideally, the sum $\hat{y}_3(t)+\hat{z}_3(t)$ of them is zero, i.e., the boom end will enter into static state quickly in the revolution direction after the vibration damping control is applied.

Figure 9:
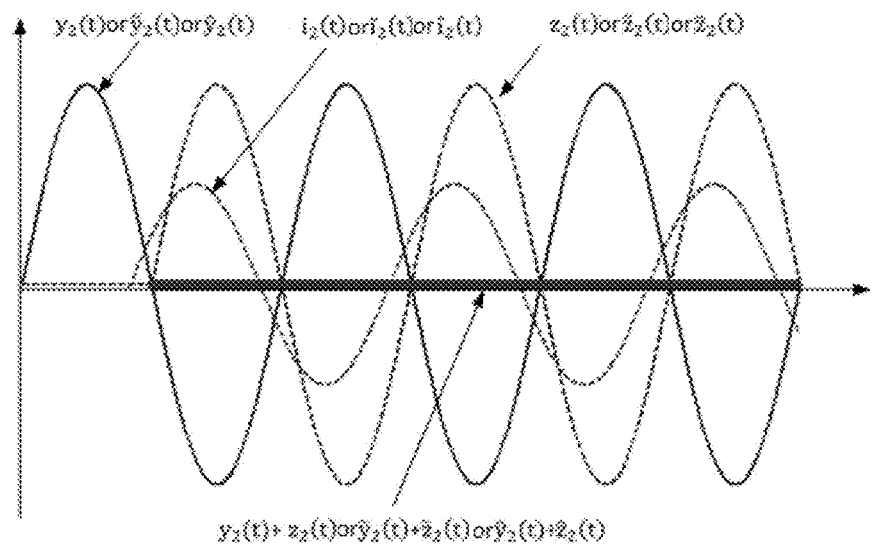
FIG. 9 illustrates a signal oscillogram of the vibration damping mode 3 in the present invention.

Please see FIG. 9, which illustrates the oscillograms of $y_3(t)$, (or $\tilde{y}_3(t)$, $\hat{y}_3(t)$), $i_3(t)$ (or $\tilde{i}_3(t)$, $\hat{i}_3(t)$), $z_3(t)$ (or $\tilde{z}_3(t)$, $\hat{z}_3(t)$), and $y_3(t)+z_3(t)$ (or $\tilde{y}_3(t)+\tilde{z}_3(t)$, $\hat{y}_3(t)+\hat{z}_3(t)$). It is seen from FIG. 9: $z_3(t)$ has the same amplitude value as $y_3(t)$ but is opposite in phase, and the sum $y_3(t)+z_3(t)$ of them is approximately zero. The other forms of vibration severity signal are similar to that case.

Vibration damping mode 4: i.e., the revolution process of pump truck (without pumping); in this case, no vibration damping control is required. Therefore, the control signal is 0.

With the method provided in preferred embodiments of the present invention, different vibration damping modes can be used against the causes for vibration in different operating modes, so as to suppress the vibration of boom end in the revolution direction more effectively.

Figure 10:
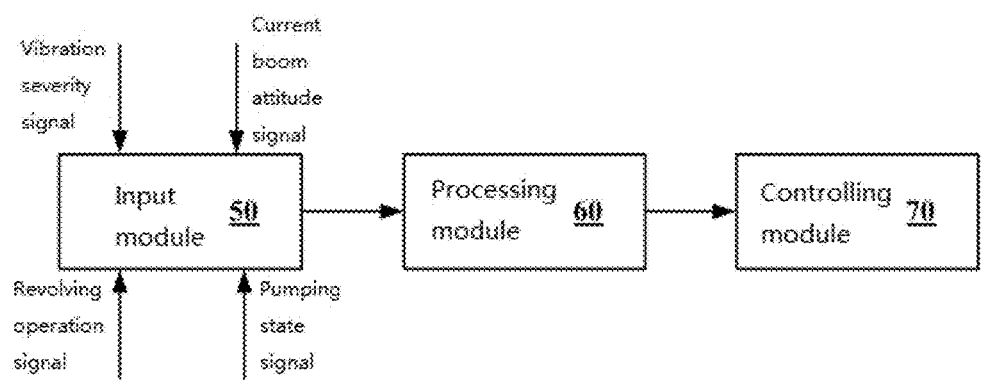
FIG. 10 illustrates a block diagram of the revolution vibration suppression controller for the pump truck boom in the present invention.

In another aspect of the present invention, as shown in FIG. 10, the revolution vibration suppression controller for the pump truck boom provided in the present invention comprises an input module 50, a processing module 60, and a control module 70, which are connected in sequence, wherein, the input module 50 is designed to receive a vibration severity signal that represents the vibration severity of boom 1 in the revolution direction; the processing module 60 is designed to extract the dynamic characteristic parameters of the boom, generate a control signal that can compensate the vibration severity according to the vibration severity signal and the extracted dynamic characteristic parameters, and send the control signal to the control module 70; the control module 70 is designed to control the revolving actuator to move according to the control signal.

Wherein, the input module 50 is any receiving circuit designed to receive a vibration severity signal that represents the vibration severity of the last section 11 of boom 1 in the revolution direction. As described above, the vibration severity can be represented with signals in different forms, such as the displacement, the speed, and the acceleration of the boom end in the revolution direction; the revolution angle, the angular speed, and the angular acceleration of the revolving platform; the pressure and the pressure difference of oil inlet/outlet of the revolving actuator, etc.

Preferably, the input module 50 is also designed to receive a current boom attitude signal; the processing module 60 is also designed to extract the dynamic characteristic parameters of the boom corresponding to the current boom attitude from a predefined dynamic characteristic parameter database, according to the received current boom attitude signal.

The setup and function of the dynamic performance parameter database have been described above, and will not be further detailed here. The database can be built in the processing module 60 or outside of the controller.

The processing module 60 is designed to calculate a control signal. The calculation method has been described above, and will not be detailed further here.

It should be noted that the fore-mentioned revolving operation signal and pumping state signal are also received by the input module 50. That is to say, the input module 50 is also designed to receive revolving operation signal and pumping state signal, and the processing module 60 is also designed to judge the operating mode of the pump truck according to the revolving operation signal and pumping state signal, with reference to Table 1.

Figure 11:
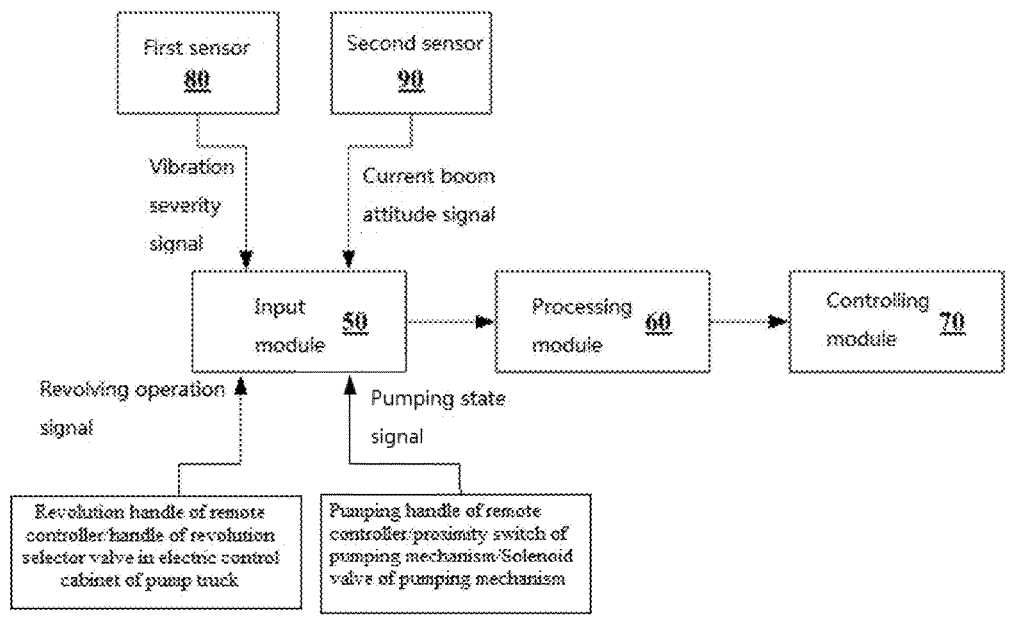
FIG. 11 illustrates a block diagram of the revolution vibration suppression device for the pump truck boom in the present invention.
Figure 12:
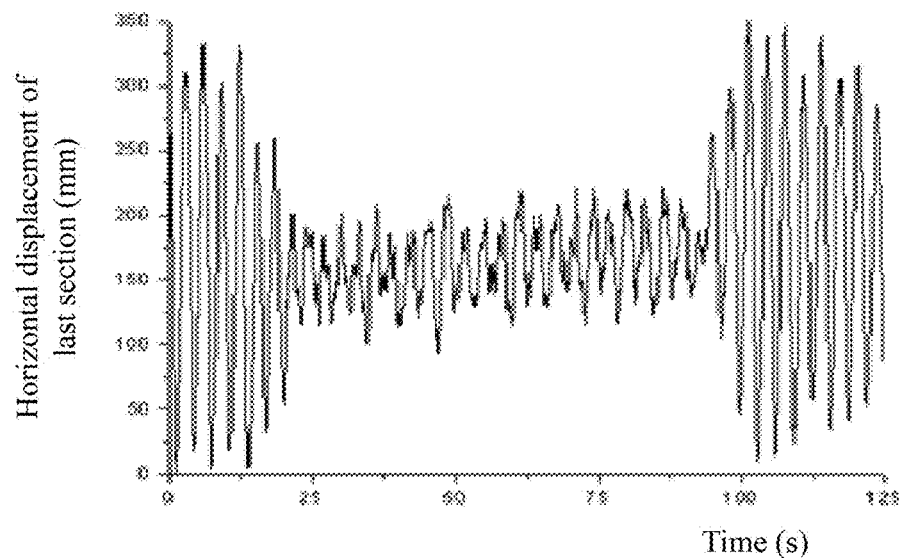
FIG. 12 illustrates an diagram showing the effect of vibration suppression of the technical scheme in the present invention on the last section of a pump truck boom.

As shown in FIG. 11, the present invention further provides a revolution vibration suppression device for the boom of a pump truck, comprising: a first sensor 80 designed to detect the vibration severity of the boom 1 in the revolution direction and generate a vibration severity signal that presents the vibration severity of the boom 1 in the revolution direction; and, the revolution vibration suppression controller described above; wherein, the first sensor 80 is connected to the input module 50 in the revolution vibration suppression controller.

The first sensor 80 can be a displacement sensor, a speed sensor, an acceleration sensor, an angular sensor, or a pressure sensor. The vibration in the revolution direction can be obtained by measuring the parameters of the last section 11, i.e., the revolution displacement, the speed, and the acceleration of the last section 11, etc.; therefore, the first sensor can be any of a displacement sensor, a speed sensor, an acceleration sensor, or an inclination sensor. Alternatively, an angular sensor can be used to detect the angle, the angular speed, or the angular acceleration of the revolution supporting mechanism to reflect the vibration severity. Alternatively, a pressure sensor can be used to detect the pressure or pressure difference of the oil inlet/outlet of the revolving actuator (e.g., hydraulic motor, revolving cylinder, etc.) to reflect the vibration severity.

Preferably, the revolution vibration suppression device further comprises a second sensor 90, which is connected to the input module 50 and designed to detect the current boom attitude and generate a current boom attitude signal.

Preferably, the second sensor 90 comprises a plurality of sensors, which are designed to detect the inclinations of the boom sections in relation to the horizontal plane or the vertical plane or detect the included angles between adjacent boom sections respectively, and the current boom attitude signal is a signal that indicates the inclinations of the boom sections in relation to the horizontal plane or the vertical plane or a signal that indicates the included angles between adjacent boom sections.

Preferably, the second sensor 90 is an attitude sensor. Among existing sensors, there are many attitude sensors designed to detect the attitude of an object. Such an attitude sensor measures multiple parameters of the object in relation to the horizontal or vertical direction, and thereby judges the attitude of the object. In the device provided in the present invention, the second sensor 90 preferably employs such an attitude sensor to carry out measurement more accurately and reliably; for example, the second sensor 90 can be inclination sensors that detect the inclinations of the boom sections to the horizontal plane or the vertical plane or angle sensors that detect the included angles between adjacent boom sections.

The present invention further provides a pump truck, which comprises the revolution vibration suppression device provided in the present invention. With the revolution vibration suppression device that utilizes the technical scheme described above, the vibration of the boom 1 on a pump truck in the revolution direction can be reduced effectively, and thereby the safety of the pump truck and the operation safety can be improved.

The boom of a concrete pump truck that utilizes the technical scheme of the present invention is experimented under actual operating conditions. It is seen from the experimental result: with the technical scheme of the present invention, the vibration of the boom on the concrete pump truck in the revolution direction is reduced by 80% under ideal operating conditions. In the experiment, a concrete pump truck with 5 boom sections is used, and the first-order resonant frequency of the pump truck which is in horizontal attitude is 0.28 Hz. It is known from the vibration theory that, vibration control at that resonant frequency is the best representative for the performance of the active vibration suppression system. FIG. 4 shows a diagram of displacement-time of the last section of the pump truck boom in the revolution direction, wherein, there is no vibration suppression within two time intervals 0-25 s and 100 s-125 s, while there is vibration suppression within the time interval 25 s-100 s. It can be seen that, the vibration displacement amplitude of the last section 11 in the revolution direction without vibration suppression is approx. 350 mm; in contrast, in the vibration suppression period, the vibration displacement amplitude of the last section 11 can be quickly stabilized at about 80 mm within 2 s, and the vibration of the pump truck boom in the revolution direction is converged to about 80% when the vibration suppression described in the technical scheme of the present invention is applied.

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the protected domain of the present invention.

In addition, it should be noted: the specific technical features described in above embodiments can be combined in any appropriate form, provided that there is no conflict. To avoid unnecessary repetition, the possible combinations are not described specifically in the present invention.

Moreover, the different embodiments of the present invention can be combined freely as required, as long as the combinations don't deviate from the ideal and spirit of the present invention. However, such combinations shall also be deemed as falling into the scope disclosed in the present invention.

The invention claimed is:

1. A revolution vibration suppressing method for a pump truck boom, wherein, the boom is mounted on a revolving platform of a pump truck, and the revolving platform is driven to revolve by a revolving actuator so as to drive the boom to revolve, is characterized in that, the revolution vibration suppressing method comprises:

detecting actual vibration severity of the boom in a revolution direction;

extracting dynamic characteristic parameters of the boom;

calculating a control signal that can be used to control the revolving actuator to compensate vibration severity according to the actual vibration severity detected and the dynamic characteristic parameters extracted;

establishing a model of a vibration severity signal;

using a vibration damping mode for the control signal calculated as follows, according to an operating mode of the pump truck:

a. the vibration severity signal is modeled with the following equation, when the operating mode is "sudden stop of revolution in non-pumping process":

$$y_1(t) = \sum_{i=1}^{n} B_{1i} e^{-\xi_i \omega_i t} \sin(\omega_i t + \alpha_{1i})$$

where, $y_1(t)$ is the vibration severity signal, $B_{1i}$ is a vibration amplitude in an $i^{th}$ order revolution mode, $\xi_i$ is a damping ratio of the boom in the $i^{th}$ order revolution mode, $\omega_i$ is a vibration frequency of the boom in the $i^{th}$ order revolution mode, $\alpha_{1i}$ is a phase in the $i^{th}$ order revolution mode, and n is the order of modes; and the control signal is calculated with the following equation:

$$i_1(t) = \sum_{i=1}^{n} \frac{1}{k_i} B_{1i} e^{-\xi_i \omega_i t} \sin(\omega_i t + \alpha_{1i} + \Delta\varphi_i + \pi)$$

where, $i_1(t)$ is the control signal, $k_i$ is amplitude gain, and $\Delta\phi_i$ is phase difference, or b. the vibration severity signal is modeled with the following equation, when the operating mode is "pumping without revolution":

$$y_2(t) = \sum_{i=1}^{n} B_{2i} \sin(\omega_i t + \alpha_{2i})$$

where, $y_2(t)$ is the vibration severity signal, $B_{2i}$ is the vibration amplitude in the $i^{th}$ order revolution mode, $\omega_i$ is the vibration frequency of the boom in the $i^{th}$ order revolution mode, $\alpha_{2i}$ is the phase in the $i^{th}$ order revolution mode, and n is the order of modes; and the control signal is calculated with the following equation:

$$i_2(t) = \sum_{i=1}^{n} \frac{1}{k_i} B_{2i} \sin(\omega_i t + \alpha_{2i} + \Delta\varphi_i + \pi)$$

where, $i_2(t)$ is the control signal, $k_i$ is amplitude gain, and $\Delta\phi_i$ is phase difference, or c. the vibration severity signal is modeled with the following equation, when the operating mode is "sudden stop of revolution in pumping process":

$$y_3(t) = \sum_{i=1}^{n} B_{1i} e^{-\xi_i \omega_i t} \sin(\omega_i t + \alpha_{1i}) + \sum_{i=1}^{n} B_{2i} \sin(\omega_i t + \alpha_{2i})$$

where, $y_3(t)$ is the vibration severity signal, $B_{1i}$ is the vibration amplitude in the $i^{th}$ order first revolution mode, $B_{2i}$ is the vibration amplitude in the $i^{th}$ order second revolution mode, $\xi_i$ is the damping ratio of the boom in the $i^{th}$ order revolution mode, $\omega_i$ is the vibration frequency of the boom in the $i^{th}$ order revolution mode, $\alpha_{1i}$ is the phase in the $i^{th}$ order first revolution mode, $\alpha_{2i}$ is the phase in the $i^{th}$ order second revolution mode, and n is the order of modes; and the control signal is calculated with the following equation:

$$i_3(t) = \sum_{i=1}^{n} \frac{1}{k_i} B_{1i} e^{-\xi_i \omega_i t} \sin(\omega_i t + \alpha_{1i} + \Delta\phi_i + \pi) + \sum_{i=1}^{n} \frac{1}{k_i} B_{2i} \sin(\omega_i t + \alpha_{2i} + \Delta\phi_i + \pi)$$

where, $i_3(t)$ is the control signal, $k_i$ is amplitude gain, and $\Delta\phi_i$ is phase difference, or d. the control signal is 0 (i.e., no vibration damping), when the operating mode is "revolution without pumping"; and driving the revolving actuator according to the control signal to move, to suppress the actual vibration severity of the boom in the revolution direction.

2. The revolution vibration suppressing method according to claim 1, wherein, the boom comprises N boom sections, and the vibration severity is the vibration severity of the last boom section of the boom in the revolution direction.

3. The revolution vibration suppressing method according to claim 2, wherein, the vibration severity in the revolution direction can be presented in any of the following forms:

(I) the displacement, the speed, and the acceleration of the boom end in the revolution direction;
(II) the revolution angle, the angular speed, and the angular acceleration of the revolving platform;
(III) the pressure and the pressure difference of the oil inlet/outlet of the revolving actuator.

4. The revolution vibration suppressing method according to claim 1, wherein, further comprising:

detecting the attitude of the boom;
the step of extracting the dynamic characteristic parameters of the boom can be: extracting the corresponding dynamic performance parameter from a predefined dynamic performance parameter database according to the attitude of the boom.

5. A revolution vibration suppressing controller for a pump truck boom, wherein, the boom is mounted on a revolving platform of a pump truck, and the revolving platform is driven to revolve by a revolving actuator so as to drive the boom to revolve; the revolution vibration suppressing controller comprises an input module, a processing module, and a control module, is characterized in that:

the input module is designed to receive a vibration severity signal based on selected modeling that represents vibration severity of boom in a revolution direction;
the processing module is designed to extract dynamic characteristic parameters of the boom, generate a control signal that can compensate the vibration severity according to the vibration severity signal and the extracted dynamic characteristic parameters, and send the control signal to the control module;
the control module to control the revolving actuator to move according to the control signal;

wherein, the processing module can use a vibration damping mode for the control signal calculated as follows, according to an operating mode of the pump truck:

(1) the vibration severity signal is modeled with the following equation, when the operating mode is "sudden stop of revolution in non-pumping process":

$$y_1(t) = \sum_{i=1}^{n} B_{1i} e^{-\xi_i \omega_i t} \sin(\omega_i t + \alpha_{1i})$$

where, $y_1(t)$ is the vibration severity signal, $B_{1i}$ is a vibration amplitude in an $i^{th}$ order revolution mode, $\xi_i$ is a damping ratio of the boom in the $i^{th}$ order revolution mode, $\omega_i$ is a vibration frequency of the boom in the $i^{th}$ order revolution mode, $\alpha_{1i}$ is a phase in the $i^{th}$ order revolution mode, and n is the order of modes; and the control signal is calculated with the following equation:

$$i_1(t) = \sum_{i=1}^{n} \frac{1}{k_i} B_{1i} e^{-\xi_i \omega_i t} \sin(\omega_i t + \alpha_{1i} + \Delta\varphi_i + \pi)$$

where, $i_1(t)$ is the control signal, $k_i$ is amplitude gain, and $\Delta\phi_i$ is phase difference, (2) the vibration severity signal is modeled with the following equation, when the operating mode is "pumping without revolution":

$$y_2(t) = \sum_{i=1}^{n} B_{2i} \sin(\omega_i t + \alpha_{2i})$$

where, $y_2(t)$ is the vibration severity signal, $B_{2i}$ is the vibration amplitude in the $i^{th}$ order revolution mode, $\omega_i$ is the vibration frequency of the boom in the $i^{th}$ order revolution mode, $\alpha_{2i}$ is the phase in the $i^{th}$ order revolution mode, and n is the order of modes;

the control signal is calculated with the following equation:

$$i_2(t) = \sum_{i=1}^{n} \frac{1}{k_i} B_{2i} \sin(\omega_i t + \alpha_{2i} + \Delta\varphi_i + \pi)$$

where, $i_2(t)$ is the control signal, $k_i$ is amplitude gain, and $\Delta\phi_i$ is phase difference, (3) the vibration severity signal is modeled with the following equation, when the operating mode is "sudden stop of revolution in pumping process":

$$y_3(t) = \sum_{i=1}^{n} B_{1i} e^{-\xi_i \omega_i t} \sin(\omega_i t + \alpha_{1i}) + \sum_{i=1}^{n} B_{2i} \sin(\omega_i t + \alpha_{2i})$$

where, $y_3(t)$ is the vibration severity signal, $B_{1i}$ is the vibration amplitude in the $i^{th}$ order first revolution mode, $B_{2i}$ is the vibration amplitude in the $i^{th}$ order second revolution mode, $\xi_i$ is the damping ratio of the boom in the $i^{th}$ order revolution mode, $\omega_i$ is the vibration frequency of the boom in the $i^{th}$ order revolution mode, $\alpha_{1i}$ is the phase in the $i^{th}$ order first revolution mode, $\alpha_{2i}$ is the phase in the $i^{th}$ order second revolution mode, and n is the order of modes;

the control signal is calculated with the following equation:

$$i_3(t) = \sum_{i=1}^{n} \frac{1}{k_i} B_{1i} e^{-\xi_i \omega_i t} \sin(\omega_i t + \alpha_{1i} + \Delta\phi_i + \pi) + \sum_{i=1}^{n} \frac{1}{k_i} B_{2i} \sin(\omega_i t + \alpha_{2i} + \Delta\phi_i + \pi)$$

where, $i_3(t)$ is the control signal, $k_i$ is amplitude gain, and $\Delta\phi_i$ is phase difference.

6. The revolution vibration suppressing controller according to claim 5, wherein, the boom comprises N boom sections, and the vibration severity signal represents the vibration severity of the last boom section of the boom in the revolution direction.

7. The revolution vibration suppressing controller according to claim 6, wherein, the vibration severity in the revolution direction can be presented in any one of the following forms:
   (I) the displacement, the speed, and the acceleration of the boom end in the revolution direction;
   (II) the revolution angle, the angular speed, and the angular acceleration of the revolving platform;
   (III) the pressure and the pressure difference of the oil inlet/outlet of the revolving actuator.

8. The revolution vibration suppressing controller according to claim 5, wherein, the input module is further designed to receive the attitude signal of the boom; the processing module is further designed to extract the corresponding dynamic performance parameter from a predefined dynamic performance parameter database according to the attitude of the boom.

9. A pump truck including the vibration suppression controller according to claim 5, the revolving platform, and the revolving actuator characterized in that, the pump truck comprises a revolution vibration suppression device that includes:
   a first sensor, which is designed to detect vibration severity of the boom in the revolution direction and to generate a vibration severity signal that represents vibration severity of the boom in the revolution direction; and
   the first sensor is connected to the input module of the revolution vibration suppression controller.

10. The pump truck according to claim 9, wherein, the first sensor can be a displacement sensor, a speed sensor, an acceleration sensor, an angular sensor, or a pressure sensor.

11. The pump truck according to claim 9, further comprising a second sensor, which is connected to the input module and designed to detect the current boom attitude and generate a current boom attitude signal.

12. A pump truck according to claim 9, wherein, the vibration severity in the revolution direction can be presented in any one of the following forms:
   (I) the displacement, the speed, and the acceleration of the boom end in the revolution direction;
   (II) the revolution angle, the angular speed, and the angular acceleration of the revolving platform;
   (III) the pressure and the pressure difference of the oil inlet/outlet of the revolving actuator.

* * * * *